US012367312B2

(12) United States Patent
Wang et al.

(10) Patent No.: US 12,367,312 B2
(45) Date of Patent: Jul. 22, 2025

(54) DISTRIBUTING DIGITAL COMPONENTS WHILE SECURING USER DATA

(71) Applicant: Google LLC, Mountain View, CA (US)

(72) Inventors: Gang Wang, Frederick, MD (US); Chin-Yet Lin, San Jose, CA (US); Rishav Anand, Mountain View, CA (US); Shruti Murali, Sunnyvale, CA (US); Tenghui Liu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/284,755

(22) PCT Filed: Jan. 19, 2023

(86) PCT No.: PCT/US2023/011158
§ 371 (c)(1),
(2) Date: Sep. 28, 2023

(87) PCT Pub. No.: WO2024/096921
PCT Pub. Date: May 10, 2024

(65) Prior Publication Data
US 2025/0077702 A1    Mar. 6, 2025

Related U.S. Application Data

(60) Provisional application No. 63/421,866, filed on Nov. 2, 2022.

(51) Int. Cl.
*G06F 21/62* (2013.01)
(52) U.S. Cl.
CPC .............................. *G06F 21/6245* (2013.01)
(58) Field of Classification Search
CPC ...... G06F 21/06; G06F 21/62; G06F 21/6218; G06F 21/6245
See application file for complete search history.

(56) References Cited

U.S. PATENT DOCUMENTS 7,483,893 B2   1/2009   McVeigh et al.
7,844,488 B2   11/2010  Merriman et al.
(Continued)

FOREIGN PATENT DOCUMENTS

WO   WO 2006115718   11/2006
WO   WO 2022125182   6/2022

OTHER PUBLICATIONS

International Search Report and Written Opinion in International Appln. No. PCT/US2023/011158, mailed on Jul. 27, 2023, 13 pages.

*Primary Examiner* — D'Arcy Winston Straub
(74) *Attorney, Agent, or Firm* — Fish & Richardson P.C.

(57) ABSTRACT

Methods, systems, and apparatus, including computer programs encoded on a computer storage medium, for distributing digital component while securing user data are described. In one aspect, a method includes receiving, by a multi-platform server and from a client device, a request for a digital component for presentation by the client device. The request for the digital component includes (i) request data that is opaque to the multi-platform server, and (ii) sensitive user data that is managed by the client device. In response to receiving the request for the digital component, the multi-platform server transmits, to a first content platform, a contextual request that includes the request data from the client device and that does not include the sensitive user data. After transmitting the contextual request, the multi-platform server receives, from the first content platform, a contextual response that includes a selection data unit for a first repository of digital components.

20 Claims, 6 Drawing Sheets

(56) References Cited

U.S. PATENT DOCUMENTS

| | | |
|---|---|---|
| 10,032,191 B2 | 7/2018 | Harrison |
| 10,049,391 B2 | 8/2018 | Buchalter et al. |
| 10,354,276 B2 | 7/2019 | Schobeiri et al. |
| 10,445,781 B2 | 10/2019 | Nolet |
| 10,997,632 B2 | 5/2021 | Segalov et al. |
| 11,276,088 B1 | 3/2022 | Saifee et al. |
| 11,354,682 B2 | 6/2022 | Jha et al. |
| 2011/0321167 A1 | 12/2011 | Wu et al. |
| 2020/0160388 A1* | 5/2020 | Sabeg ................ G06F 21/6245 |
| 2021/0320914 A1* | 10/2021 | Pillai ................ H04L 63/0407 |

* cited by examiner

DISTRIBUTING DIGITAL COMPONENTS WHILE SECURING USER DATA

CROSS-REFERENCE TO RELATED APPLICATIONS

This application is a National Stage Application under 35 U.S.C. § 371 and claims the benefit of International Application No. PCT/US2023/011158, filed Jan. 19, 2023, which claims the benefit of priority to U.S. Provisional Application Ser. No. 63/421,866, filed Nov. 2, 2022. The contents of the prior applications are incorporated herein by reference in their entirety.

TECHNICAL FIELD

This specification is related to data processing, data privacy, and data security.

BACKGROUND

Demand-side platforms (DSPs) can be used by digital content providers as intermediaries for providing their content to client devices, through digital channels. Supply-side platforms (SSPs) can be used by publishers and other digital media owners as intermediaries for identifying and providing digital components for presentation with their digital media. Conventionally, data associated with client device users is shared (e.g., in the form of cookies or other data) between the digital media owners, SSPs, and/or DSPs, for the purpose of selecting and serving user-focused content. However, enhancements to user privacy have led developers to change the ways in which user data is handled. For example, some browsers are deprecating the use of third-party cookies.

SUMMARY

In general, one innovative aspect of the subject matter described in this specification can be embodied in methods including the operations of receiving, by a multi-platform server and from a client device, a request for a digital component for presentation by the client device, wherein the request for the digital component includes (i) request data that is opaque to the multi-platform server, and (ii) sensitive user data that is managed by the client device: in response to receiving the request for the digital component, transmitting, by the multi-platform server and to a first content platform, a contextual request that includes the request data from the client device and that does not include the sensitive user data: after transmitting the contextual request, receiving, by the multi-platform server and from the first content platform, a contextual response that includes a selection data unit for a first repository of digital components, wherein the first repository of digital components is within a trust boundary of the multi-platform server and stores digital components of the first content platform: in response to receiving the contextual response, transmitting, by the multi-platform server, the selection data unit to the first repository of digital components: after transmitting the selection data unit to the first repository of digital components, receiving, by the multi-platform server from the first repository of digital components, a plurality of digital components that satisfy the selection data unit: filtering the plurality of digital components that satisfy the selection data unit to exclude one or more digital components that do not conform to the sensitive user data received by the multi-platform server in the request for the digital component: selecting one of the digital components that remain after filtering the plurality of digital components that satisfy the selection data unit; and providing, by the multi-platform server, the selected one of the digital components for presentation by the client device. Other implementations of this aspect include corresponding apparatus, systems, and computer programs, configured to perform the aspects of the methods, encoded on computer storage devices.

These and other implementations can each optionally include one or more of the following features. In some aspects, the method includes, prior to receiving the contextual request from the client device, receiving, by the multi-platform server and from the first content platform, a first data update that specifies digital components of the first content platform and modifying, by the multi-platform server, the first repository of digital components according to the first data update.

In some aspects, the first data update specifies, for each digital component of the first content platform referenced in the first data update, a respective digital component selection factor that has been determined for the digital component. The contextual response can specify, for the selection data unit, a corresponding contextual selection factor that has been determined based on the request data from the client device.

In some aspects, selecting one of the digital components can include, for each of the digital components that remain after filtering the plurality of digital components that satisfy the selection data unit, generating a score, based on the digital component selection factor and the contextual selection factor and selecting the digital component with the greatest score.

In some aspects, the method includes receiving, by the multi-platform server and from a second content platform, a second data update that specifies digital components of the second content platform and modifying, by the multi-platform server, a second repository of digital components according to the second data update, wherein the second repository of digital components is within the trust boundary of the multi-platform server and is a different repository platform than that of the first repository of digital components, and wherein the multi-platform server uses a first adaptor to interface with the first repository of digital components and a second, different, adaptor to interface with the second repository of digital components.

In some aspects, the request for the digital component is generated by code of the first content platform that is executed by the client device. In some aspects, the selection data unit includes (i) a query header that references the first repository of digital components and (ii) a query body that is opaque to the multi-platform server, wherein transmitting the selection data unit to the first repository of digital components comprises (i) using the query header of the selection data unit to identify the first repository of digital components, and (ii) sending the query body of the selection data unit to an adaptor that provides a common interface to the first repository of digital components. The contextual response can include multiple selection data units for the first repository of digital components, and specifies, for each selection data unit of the multiple selection data units, a respective contextual selection factor that has been determined by a respective digital content server that generated the selection data unit.

In some aspects, the method includes, after filtering the plurality of digital components that satisfy the selection data unit, purging the sensitive user data from the multi-platform server.

Particular embodiments of the subject matter described in this specification can be implemented so as to realize one or more of the following advantages. A trusted server can host and execute selection logic of various content platforms when selecting digital components based on user data, such that no other entity can access the user data or the selection logic-thus, both the user data and the content platform selection logic is kept secure. Further, the amount of platform-specific code that is executed on client devices is reduced. A common data schema for various different types of digital component repositories can be used to reduce the cost of migration to new data repository technologies as the technologies are developed and/or when a content platform switches from one technology to another. By performing at least a portion of the selection logic prior to receiving a digital component request (e.g., a portion that does not rely on user data), on servers that provide the digital components, computing resources and processing times can be reduced when serving digital components. By using space-efficient data structures for retrieving, filtering, and/or selecting digital components, network bandwidth can be conserved when transmitting data between system components, and filtering can be efficiently performed in view of up-to-date information. Digital content repository adaptors can be decoupled from the rest of the code base of a trusted server, such that interfacing with the adaptors, changes within the adaptors, and the addition of new adaptors can be accomplished with minimal impact on the trusted server. Selection logic of a content platform can be based at least in part on computing a dot product of two embedding vectors—a fast computation that can be performed with fewer computing resources than would be used if directly employing a machine learning model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for selecting and distributing digital components to client devices in ways that protect user privacy and confidential data of content platforms and/or digital component providers. A trusted server can be configured to perform digital component selection processes that use sensitive user data so that the user data is not provided to any other entity. The trusted server can host and execute selection logic of various content platforms when selecting digital components based on user data in manners that ensure that no other entity can access the selection logic of the content platforms. In this way, both the data of the users and the content platforms is kept secure.

Figure 1:
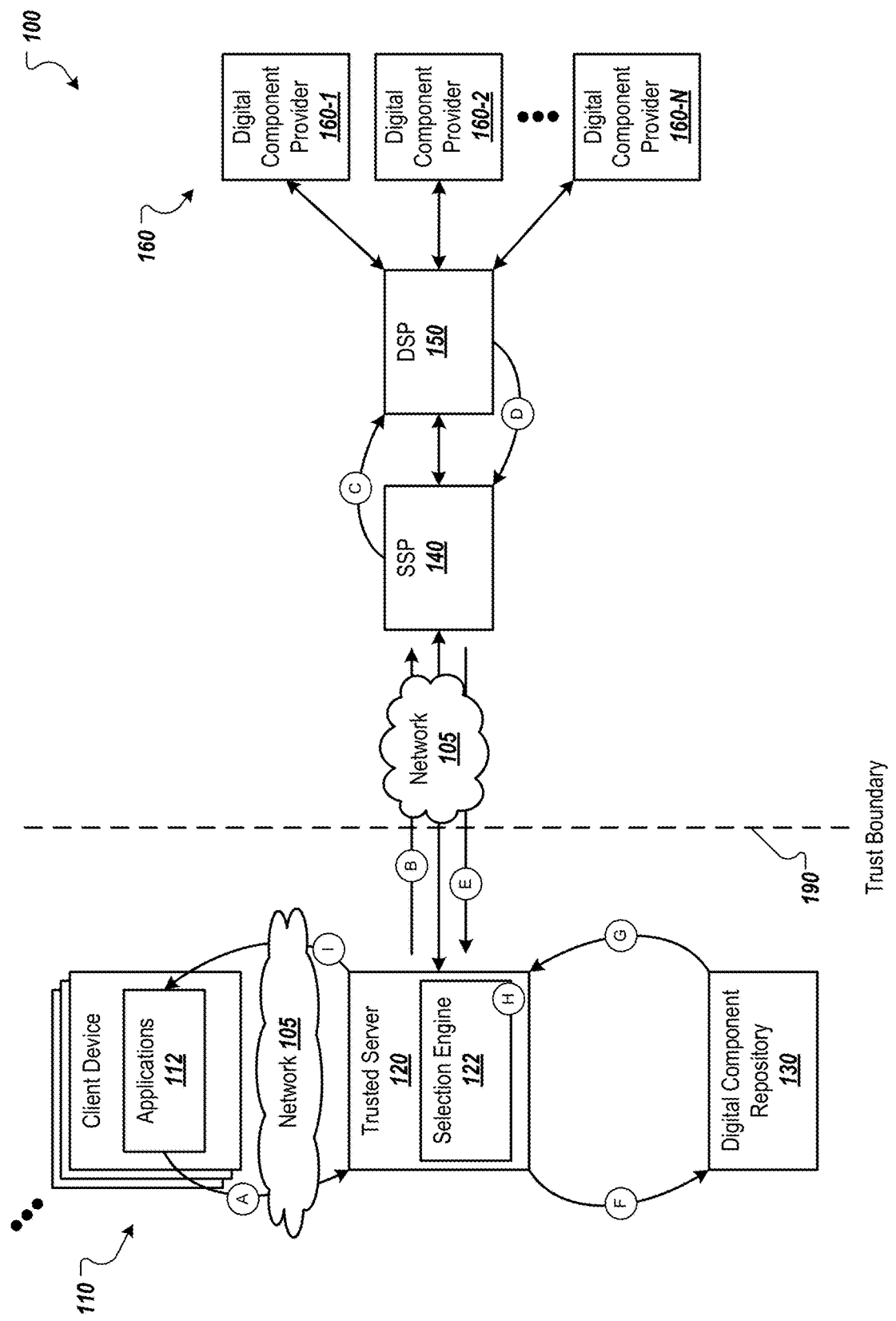
FIGS. 1-2 are block diagrams of example environments in which a trusted, multi-platform server distributes digital components to client devices in a privacy preserving manner.

FIG. 1 is a block diagram of an example environment 100 in which a trusted, multi-platform server 120 distributes digital components to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to the trusted server 120 and connects the trusted server 120 to content platforms, such as supply side platforms (SSPs) 140 and/or demand side platforms (DSPs) 150. The network 105 can also connect the various content platforms to one another and/or to digital component providers 160, e.g., to servers of the digital component providers 160.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for presentation in the digital component slot. In some implementations, the digital component slot and/or the resource can include code (e.g., scripts) that cause the application 112 to request a digital component from the trusted server 120.

A digital component request sent by a client device 110 can include sensitive user data related to a user of the client device 110 and/or non-sensitive data. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include user profile data and/or attributes of the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request can also include contextual data, which is generally considered non-sensitive. The contextual data can describe the environment in which a selected digital component will be presented. The contextual data can include, for example, coarse location information indicating a general location of the client device 110 that sent the digital component request, a resource (e.g., website or native application) with which the selected digital component will be presented, a spoken language setting of the application 112 or client device 110, the number of digital component slots in which digital components will be presented with the resource, the types of digital component slots, and other appropriate contextual information.

The trusted server 120 can be implemented using one or more server computers (or other appropriate computing devices), that may be distributed across multiple locations. In general, the trusted server 120 receives requests for digital components from client devices 110, selects digital components based on data included in the requests, and sends the selected digital components to the client devices 110.

As the trusted server 120 receives sensitive user data, the trusted server 120 can be operated and maintained by an independent trusted party, e.g., a party that is different from the users of the client devices, the parties that operate the SSPs 140 and DSPs 150, and the digital component providers 160. For example, the trusted server 120 can be operated by an industry group or a governmental group.

As described in more detail below, the trusted server 120 can select a digital component from a set of digital components stored in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that defines the situations in which the digital component is eligible to be provided to a client device 110 in response to a digital component request received from the client device 110 and/or a selection value that indicates an amount that will be provided to the publisher if the digital component is displayed with a resource of the publisher and/or interacted with by a user when presented. For example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary 190 that separates the client device 110, the trusted server 120, and the digital component repository 130 from the SSP 140, DSP 150, and digital component providers 160. In this way, no entity other than the client device 110 and the trusted server 120 receives the user data that is included in a digital component request. This preserves user privacy and data security, especially when compared to techniques that employ third party cookies to send user data across the Internet.

An example process for selecting and providing a digital component for presentation at a client device 110 is illustrated in stages A-I, which illustrate a flow of data between the components of the environment 100.

In stage A, the application 112 sends a digital component request to the trusted server 120. As described above, the application 112 can send a digital component request to request a digital component for presentation in a digital component slot of a resource being presented by the application 112. The digital component request can include user data and contextual data.

In stage B, the trusted server 120 sends a context-based digital component request to an SSP 140. The context-based digital component request can include the contextual data of the digital component request received from the application 112. However, the context-based digital component request does not include any of the user data. The trusted server 120 can temporarily store the user data while waiting for a response from the SSP 140. The trusted server 120 can send the context-based digital component request to an SSP 140 for the publisher of the resource being presented by the application 112.

In stage C, the SSP 140 forwards the context-based digital component request to one or more DSPs 150. In stage D, each DSP 150 sends, to the SSP 140, one or more selection parameters (e.g., including selection values) for one or more digital components, e.g., digital components stored in the digital component repository 130. For example, the DSP 150 can determine the one or more selection parameters for the digital component and/or select a digital component based on the contextual data of the context-based request. In some implementations, the DSP 150 can provide a digital component instead of or in addition to providing the one or more selection parameters, e.g., a digital component that is not stored in the digital component repository 130. In some implementations, each DSP 150 can send the one or more selection parameters with data indicating the digital component to which the selection parameter(s) apply. The digital components for which selection parameters are provided by the DSPs 150 (and/or which are directly provided by the DSPs 150) can be referred to as context-based digital components.

In stage E, the SSP 140 sends the digital components and/or selection parameters to the trusted server 120. In some implementations, the SSP 140 can filter digital components and/or selection parameters prior to sending the digital components and/or selection parameters to the trusted server 120. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage F, the trusted server 120 queries the digital component repository 130 for a set of user-based digital components that are selected based on the user data of the digital component request. For example, the trusted server 120 can submit a query that defines, as conditions of the query, the user data of the digital component request. In some implementations, the query can also include context-based conditions. For example, a query can request retrieval of digital components that include, as distribution criteria, a particular user group and/or a particular geographic location. Although shown after stages B-E, the trusted server 120 can query the digital component repository in parallel with these stages to reduce the latency in selecting and providing a digital component to the application 112.

In stage G, the trusted server 120 receives a set of user-based digital components from the digital component repository 130 and a digital component selection factor for each of the user-based digital components. The set of user-based digital components can include those having distribution criteria that matches the conditions of the query.

In stage H, a selection engine 122 of the trusted server 120 selects a digital component to provide to the application 112 for presentation in the digital component slot. The selection engine 122 can select a digital component from the set of context-based digital components and the user-based digital components. The selection engine 122 can select the digital components from the two sets based on the selection value for each digital component in the two sets. For example, the selection engine 122 can select the digital component having the highest selection value.

In stage I, the trusted server 120 provides the selected digital component to the application 112. The application 112 can then present the digital component with the resource being presented by the application 112.

Figure 2:
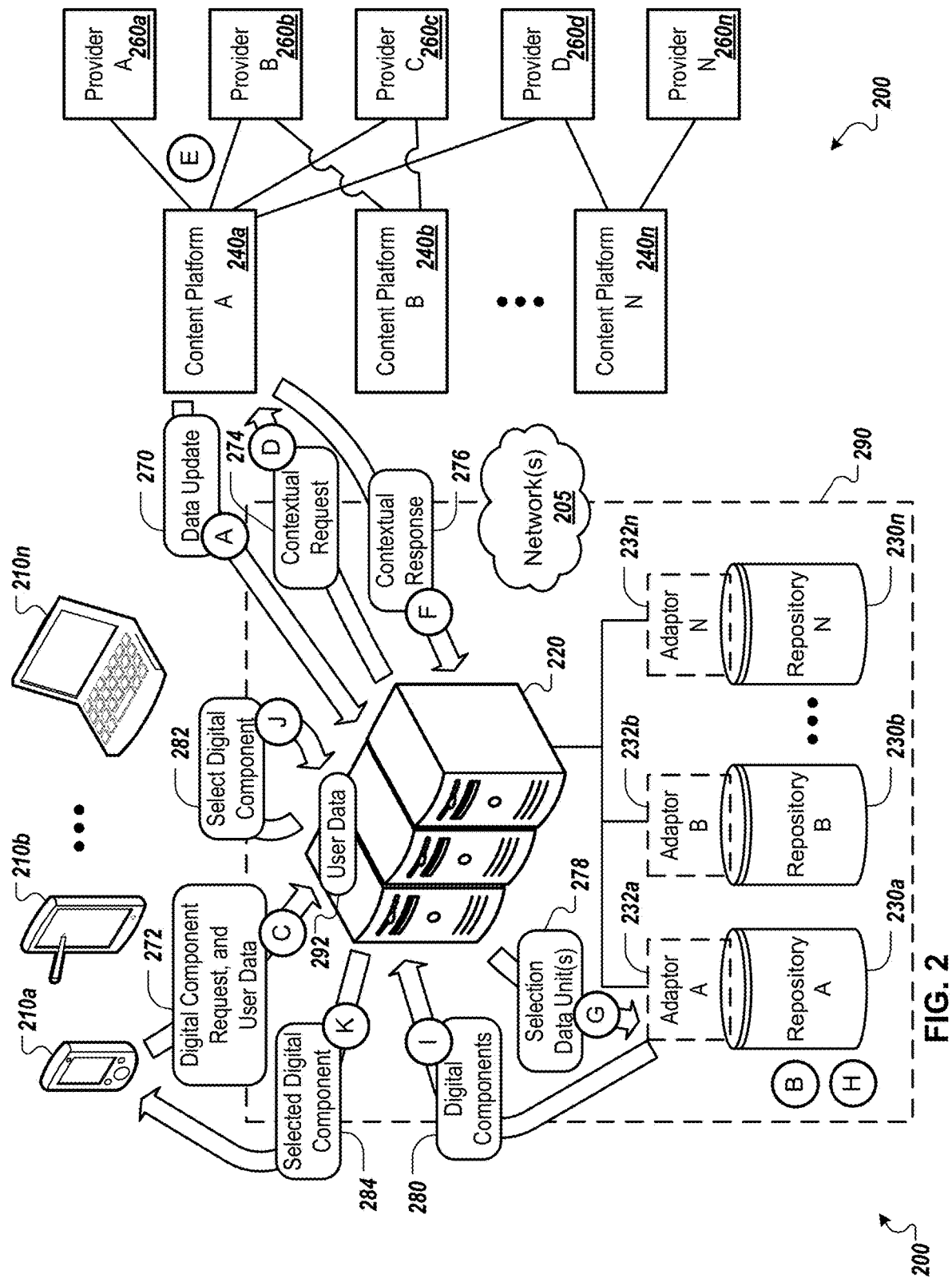

FIG. 2 is a block diagram of an example environment 200 in which a trusted server (e.g., multi-platform server(s) 220) distributes digital components to client devices 210*a-n* in a privacy preserving manner. The multi-platform server(s) 220, for example, can be similar to the trusted server 120 (shown in FIG. 1), and can be configured to communicate with multiple digital component repositories 230*a-n* (e.g., each similar to digital component repository 130, also shown in FIG. 1) by using corresponding adaptors 232*a-n*. The example environment 200 includes data communication network(s) 205 (e.g., similar to data communication network 105, shown in FIG. 1) that connects client devices 210*a-n* (e.g., similar to client devices 110, also shown in FIG. 1) to the multi-platform server 220 and connects the multi-platform server 220 to multiple different content platforms 240*a-n*. The content platforms 240, for example, can each include one or more supply side platforms (e.g., supply side platforms (SSPs) 140, shown in FIG. 1) and/or one or more demand side platforms (e.g., demand side platforms (DSPs) 150, also shown in FIG. 1). The content platforms 240, for example, can also each communicate with servers of one or more digital component providers (e.g., providers 260*a-n*, similar to providers 160, shown in FIG. 1) over the data communication network 205.

Figure 3:
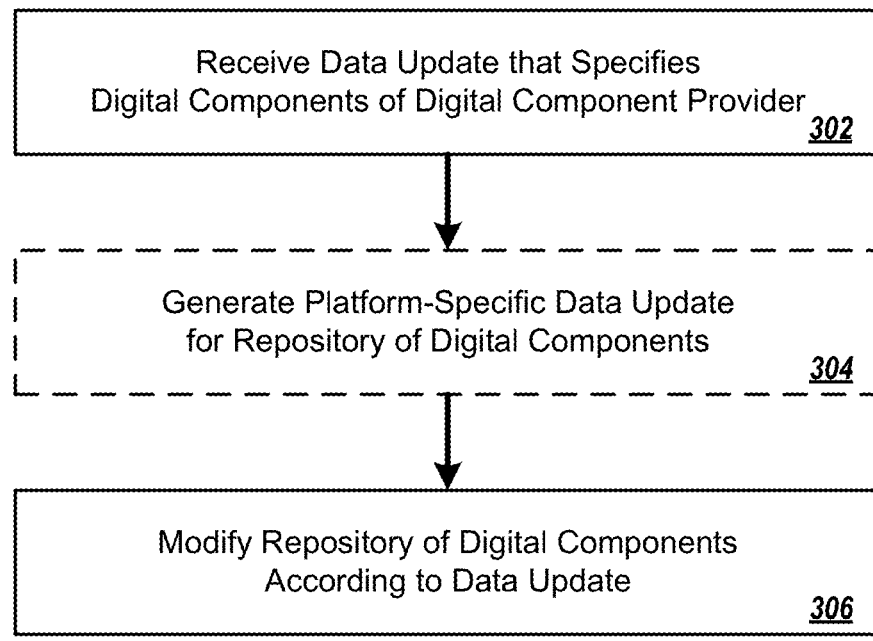
FIG. 3 is a flow diagram of an example process for modifying a repository of digital components according to a data update.

Referring now to FIG. 3, a flow diagram of an example process 300 for modifying a repository of digital components according to a data update is shown. Operations of the process 300 can be performed by a trusted server, (e.g., the trusted server 120 of FIG. 1, the multi-platform server 220 of FIG. 2, or another trusted server), and will be described with respect to FIG. 1 and/or FIG. 2 for clarity. Operations of the process 300 can also be implemented as instructions stored on one or more computer readable media, which may be non-transitory, and execution of the instructions by one or more data processing apparatus can cause the one or more data processing apparatus to perform the operations of the process 300.

In general, a trusted server can periodically receive, from various different content platforms, data updates that specify digital components of the content platform. For example, each of the content platforms 240a-n can maintain digital components (or data that defines digital components) provided by servers of one or more digital component providers 260a-n. In the present example, content platform 240a (which can also be referred to as a first content platform) can maintain digital component data from digital component providers 260a, 260b, 260c, and 260d, content platform 240b (which can also be referred to as a second content platform) can maintain digital component data from digital component providers 260b and 260c, and content platform 240n can maintain digital component data from digital component providers 260d and 260n. Each of the content platforms 240a-n, for example, can maintain the received digital component data, and can periodically and/or in response to a trigger condition, provide data updates to the multi-platform server 220. After receiving a data update from a given content platform, for example, the multi-platform server 220 can apply the data update to a digital component repository that is maintained by the server 220 for the given content platform and that is within a trust boundary 290 (e.g., similar to trust boundary 190, shown in FIG. 1) of the server 220. In the present example, digital component repository 230a (which can also be referred to as a first digital component repository) is maintained for digital components provided by content platform 240a, digital component repository 230b (which can also be referred to as a second digital component repository) is maintained for digital components provided by content platform 240b, and digital component repository 230n is maintained for digital components provided by content platform 240. The region defined by the trust boundary 290, for example, can represent a secured network, in which only the multi-platform server 220 may directly communicate with the repositories 230a-n, and in which the multi-platform server 220 serves as an intermediary between a given content platform and its corresponding digital component repository, and between the given content platform and client devices to which digital components are served. By serving as an intermediary between content platforms and client devices, for example, the amount of platform-specific code that is executed on client devices can be reduced.

At 302, a data update that specifies digital components of a digital component provider is received. For example, any of the content platforms 240a-n can provide a data update for its corresponding digital component repository 230a, for receipt by the multi-platform server 220. In some implementations, a data update can be provided at a time that is determined by a content platform. For example, each of the content platforms 240a-n can periodically (e.g., every ten minutes, every half hour, every hour, or according to another suitable schedule) push a data update to the multi-platform server 220 that facilitates an update of its corresponding repository 230a-n. As another example, a content platform can push a data update to the multi-platform server 220 in response to a trigger condition, such as a digital component change (e.g., the addition of, deletion of, and/or modification of one or more digital components) specified by one of the digital component providers 260a-n. In some implementations, a data update can be provided at a time that is determined by a multi-platform server. For example, the multi-platform server 220 can request data updates from any of the content platforms 240a-n according to periodic schedule, and/or in response to a trigger condition (e.g., when a new data instance is brought online, a loss of data, or another suitable condition).

In some implementations, a data update can include a data snapshot. For example, when providing a data update, any of the content platforms 240a-n can generate a data snapshot (e.g., a full snapshot, or an incremental snapshot that includes data updates from the time of a previous snapshot) that includes data that pertains to the digital components maintained by the content platform. When building the data snapshot, for example, a content platform can optimize the snapshot to improve serving performance based on its proprietary techniques (e.g., indexing, algorithms, etc.).

In some implementations, the data update can be formatted according to a type of data repository used by a content platform. For example, different content platforms 240a-n can use different data repository technologies (e.g., various different types of database servers, file-based servers, in-memory repositories, etc.), depending on the preferences of the operators of the content platforms. Large content platforms with extensive digital component libraries, for example, can use sharded database servers to leverage the distributed storage capabilities of such servers, whereas small content platforms with limited digital content libraries can use in-memory technologies to leverage the fast data retrieval capabilities of such technologies. Each of the repositories 230a-n maintained by the multi-platform server 220, for example, can use a same type of data repository technology as specified by a corresponding content platform 240a-n. When receiving a data update that has been formatted according a type of data repository used by a content platform, for example, the multi-platform server 220 can forward the data update directly to the content platform's corresponding repository 230a-n, where it is used to update the repository. As another example, each content platform 240a-n can directly provide updates to its corresponding repository 230a-n for the purpose of maintaining the repository-however, data provided to the content platforms 230a-n passes through the multi-platform server 220 and does not include any sensitive user data. Further, sensitive user data is only cached by the multi-platform server 220 for servicing a digital component request, for example, and is not stored by any of the repositories 230a-n.

In some implementations, the data update can be formatted according to a common data schema. For example, the multi-platform server 220 can provide a common interface to each of the content platforms 240a-n, and each of the content platforms 240a-n can provide their respective data updates using the same common data schema. The data updates can be translated by the multi-platform server 220, for example, to a platform-specific format for the content platform that provided the data update. In some implementations, translating a data schema can include generating a platform-specific query that includes field identifiers and field values that have been specified by a content platform using the common data schema. For example, the common data schema can include a digital component identifier (e.g., an opaque identifier that uniquely identifies a candidate digital component specified by a content platform), a content platform identifier (e.g., an opaque identifier that uniquely identifies the content platform that manages the digital component), a provider identifier (e.g., an opaque identifier that uniquely identifies a provider of the digital component), and one or more fields for handling the digital component during a filtering/selection process (e.g., indications of customization points, such as configuration lambda functions or other customizations, used during the process). Other examples can include fewer or additional data fields.

At 304, a platform-specific data update for a repository of digital components is optionally generated. For implementations in which received data updates have been formatted according to a common data schema, the multi-platform server 220 can translate the data received from the content platform to a platform-specific format, for a type of data repository that is used by the content platform. As another example, it may be possible for a multi-platform server 220 to use, for a content platform, a different data repository technology within the trust boundary 290) than the technology that is actually being used by the content platform outside of the trust boundary 290. As another example, the common data schema may reduce the cost of migration to new data repository technologies as the technologies are developed and/or when a content platform switches from one technology to another.

At 306, the repository of digital components is modified according to the data update. Whether receiving a data update formatted according to a platform-specific format or a common data schema, the multi-platform server 220 can modify a digital component repository within the trust boundary 290, for a corresponding content platform that provided the data update. Data updates can be intermittently received by the multi-platform server 220, for example, and can be used by the server 220 to modify the appropriate digital component repositories 230a-n, as the server 220 handles requests for digital components from the various client devices 210a-n.

Referring again to FIG. 2, an example process for distributing digital components to client devices (e.g., client device 210a) is illustrated in stages A-K, which illustrate a flow of data between the systems and components of the environment 200. Stages A-K may occur in the illustrated sequence, or they may occur in a sequence that is different than in the illustrated sequence, and/or two or more stages A-K may be concurrent. In some examples, one or more stages A-K may be repeated multiple times. The stages A-K will be referenced in further detail with respect to flow diagrams described below.

Figure 4A:
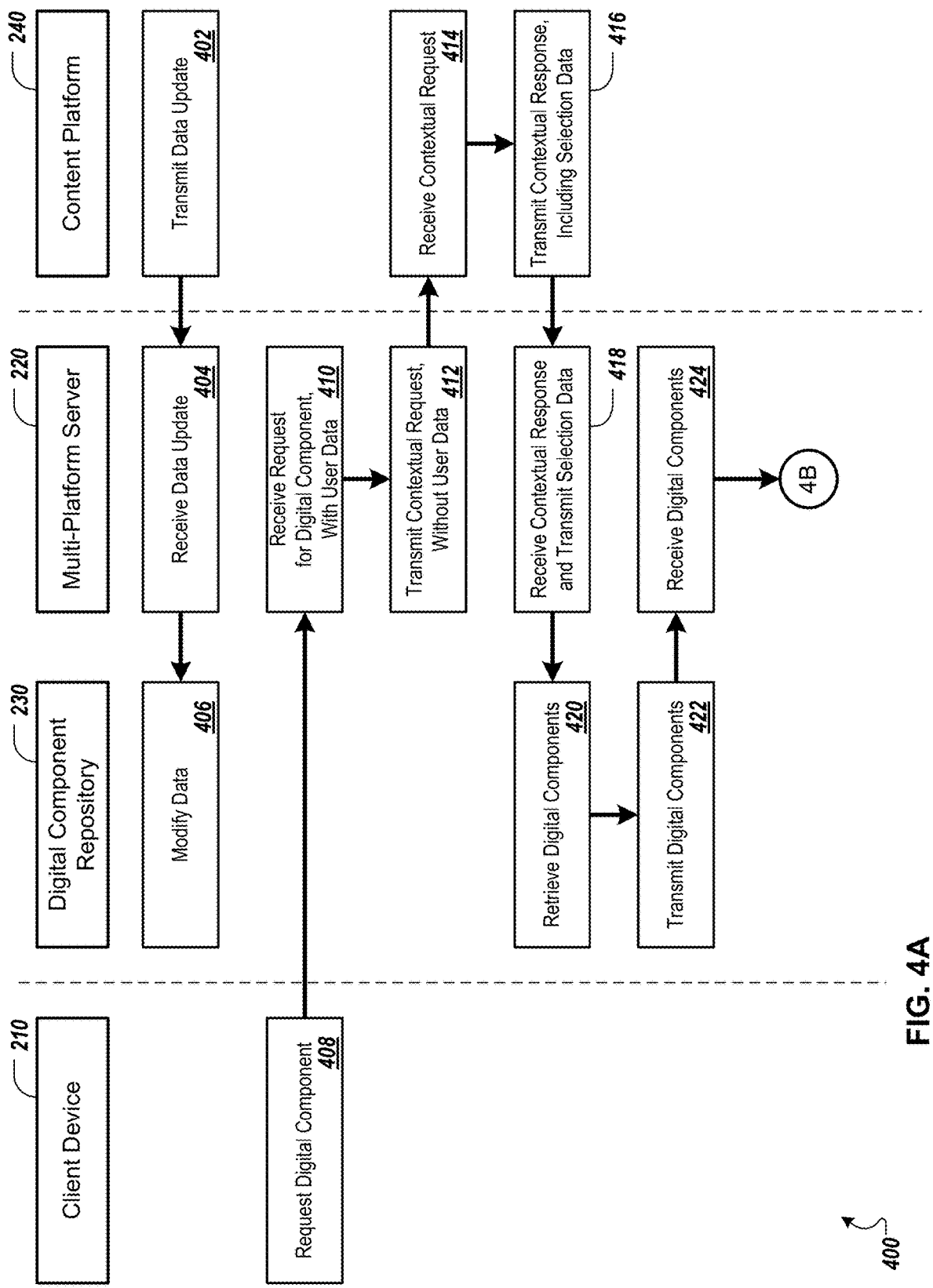
FIGS. 4A-B is a flow diagram of an example process for selecting and providing a digital component for display at a client device in a privacy preserving manner.
Figure 4B:
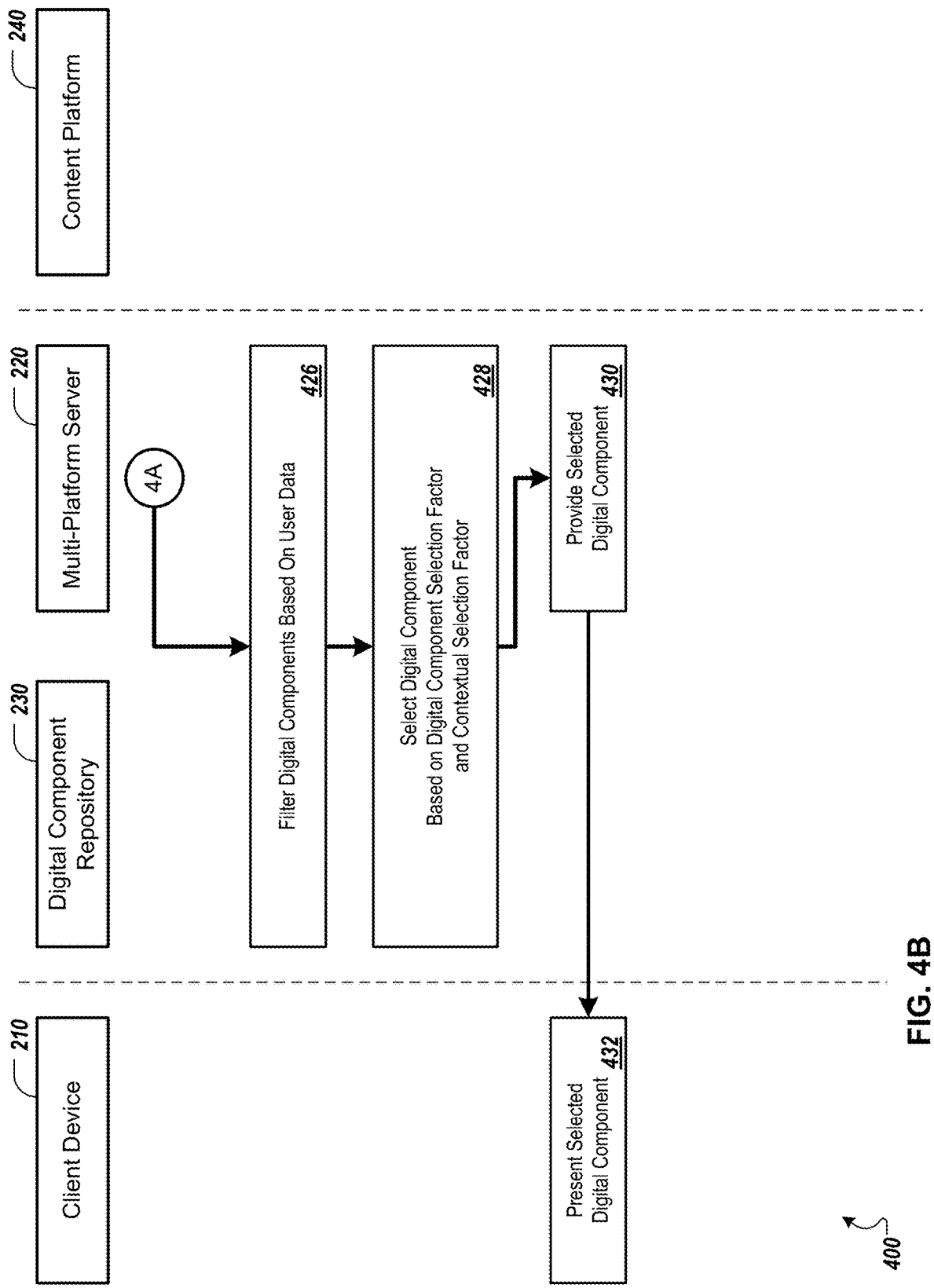

Referring now to FIGS. 4A-B, a flow diagram of an example process 400 for selecting and providing a digital component for display at a client device in a privacy preserving manner is shown. Operations of the process 400 can be performed by a trusted server (e.g., the trusted server 120 of FIG. 1, the multi-platform server 220 of FIG. 2, or another trusted server), and will be described with respect to FIG. 1 and/or FIG. 2 for clarity. Operations of the process 400 can also be implemented as instructions stored on one or more computer readable media, which may be non-transitory, and execution of the instructions by one or more data processing apparatus can cause the one or more data processing apparatus to perform the operations of the process 400.

At 402, a data update is transmitted. Referring to FIG. 2, in stage A, for example, the content platform 240a can transmit a data update 270 for receipt by the multi-platform server 220. In the present example, the data update 270 can include data updates for one or more digital components specified by one or more of the digital component providers 260a-d that are in communication with the content platform 240a. For example, any of the providers 260a-n can specify new digital components, modifications to existing digital components, and/or the removal of digital components, including digital component content, selection criteria and/or selection logic. Aspects of the data update 270 and using the data update 270 to update one of the data repositories 230a-n, for example, are described in additional detail with respect to FIG. 3.

In some implementations, the data update can specify, for each digital component of the content platform referenced in the data update, a respective digital component selection factor that has been determined for the digital component. The digital component selection factor, for example, can be determined by a source of the digital component (e.g., a digital component provider and/or a demand side platform (DSP)). For example, various attributes of the digital component can be used as input signals (e.g., associated user group, content provider, and/or landing page) for a machine learning model that generates the digital component selection factor for the digital component. After determining a digital component selection factor for a given digital component, for example, the selection factor can be associated with the digital component as metadata. For example, the digital component selection factor can be an embedding vector of multiple dimensions (e.g., 32, 64, 128, etc.), or another suitable data structure. Since the determination of the digital component selection factor is performed on the servers of the various content platforms 240a-n (or demand side platforms included in the platforms 240a-n), for example, the machine learning technology and techniques employed by such platforms can remain private. Optionally, a version identifier of a machine learning model used to determine the digital component selection factor can be included in the metadata associated with the digital component.

At 404, the data update is received. For example, the multi-platform server 220 can receive the data update 270 from the content platform 240a. In the present example, the multi-platform server 220 can determine that the data update 270 received from the content platform 240a is to be used to modify the corresponding repository 230a.

At 406, data is modified. In stage B, for example, the multi-platform server 220 can modify the corresponding digital component repository 230a of the content platform 240a, according to the received data update 270. In general, a multi-platform server can receive data updates from various different content platforms and can modify corresponding data repositories for the content platforms that are maintained within a trust boundary of the multi-platform server. In the present example, the multi-platform server 220 can receive, from each of the content platforms 240a-n, data updates that specify digital components of the respective platform. For example, content platform 240a can provide data updates that specify digital components of the content platform 240a, for use in updating digital component repository 230a. Similarly, content platform 240b can provide data updates for digital component repository 230b, content platform 240n can provide data updates for digital component repository 230n, and so forth. Each of the digital component repositories 230a-n, for example, can be within the trust boundary 290 of the multi-platform server 220, which can grant access to a digital component repository for a corresponding content platform, and can restrict access to the repository by other content platforms. The digital component repositories 230a-n may include different repository platforms (e.g., different types of databases, file systems, in-memory data management systems, etc.), with each repository platform using a different adaptor (e.g., adaptors 232a-n) to facilitate systems integration between the multi-platform server 220 and the repository.

At 408, a digital component is requested. In stage C, for example, client device 210a can provide a request 272 for a digital component for presentation by the device 210a. The digital component, for example, can be presented in a digital component slot of a resource being presented by an application executed at the device 210a. In general, a digital component request can include a content platform identifier, opaque request data, and/or sensitive user data. The digital component request 272, for example, can include an identifier for content platform 240a, request data that is opaque to the multi-platform server 220, and sensitive user data that is managed by the client device 210a.

The opaque request data, for example, can include contextual data, such as a resource identifier of a resource being presented by the client device 210a, a slot identifier of a digital component slot of the presented resource, coarse geographic data that indicates a general location of the client device (if permitted by the user of the device), a spoken language setting of the client device 210a, and/or other appropriate contextual data. Such request data can be opaque to the platform server 220, for example, as a result of the server 220 not being configured to interpret the request data, but instead being configured to receive and transmit the request data to an identified server (e.g., outside of the trust boundary 290) that is configured to interpret and respond to the request data. In another example, this request data can be opaque as a result of the client device 210a encrypting the request data, e.g., using an encryption key for which the content platform 240a having a corresponding decryption key.

The sensitive user data, for example, can include user data that is collected and managed by the client device 210a, such as set membership data (e.g., a user's membership in an interest group, a user's preference to block particular types of content, etc.), user profile data (e.g., age, gender, etc.), generalized location data (e.g., location within a zip code, city, state, etc.), and/or other appropriate user data. For example, a user's membership in an interest group can be the result of a user's browsing history, and thus is a sensitive cross-domain signal that, among other sensitive user data, is not to be shared with any of the content platforms 240a-n. As described above, the user can be provided with controls that enable the user to elect what data is provided.

In some implementations, a request for a digital component can be generated by code of a content platform that is executed by the client device. For example, the digital component request 272 transmitted by the client device 210a can be generated by code that has been previously provided by content platform 240a for execution (e.g., within a web browser) by the device 210a when a particular resource is being presented. When requesting a digital component for presentation in a slot of the particular resource, for example, the client device 210a can execute the code (e.g., a script embedded in or otherwise associated with the resource), which generates the digital component request 272.

At 410, the request for the digital component is received, with user data. For example, the multi-platform server 220 can receive the digital component request 272, including the content platform identifier, the opaque request data, and the sensitive user data. In the present example, based on the content platform identifier included in the digital component request 272, the multi-platform server 220 can identify content platform 240a as the appropriate source for a digital component for the resource being presented by the client device 210a.

At 412, a contextual request is transmitted, without the user data. In stage D, for example, in response to receiving the digital component request 272, the multi-platform server 220 can transmit contextual request 274 for receipt by the content platform 240a. In general, a contextual request can include request data (e.g., opaque request data) and can exclude sensitive user data. As part of a process for facilitating provision of a digital component for presentation within a resource, for example, the multi-platform server 220 can temporarily cache the sensitive user data 292 received in the digital component request 272, can forward the opaque request data (e.g., request data generated by the client device 210a) to the appropriate identified content platform 240a without parsing the request data, and can wait for a response from the content platform 240a that is configured to respond to the request data.

In some implementations, a contextual request can include a version identifier for a machine learning model that has been used to determine digital component selection factors for digital components maintained by a repository. For example, after receiving the digital component request 272 for digital components provided by content platform 240a, the multi-platform server 220 can identify a version identifier of a machine learning model that had previously been used by the content platform 240a to determine digital component selection factors for its digital components. As described in additional detail below, a factorized machine learning model can be used by a content platform to generate separate digital component selection factors and contextual selection factors, which can then be combined by the multi-platform server 220. Since the machine learning model may be periodically re-trained with current data (e.g., daily or multiple times per day), version management techniques can be used to maintain result quality when combining the selection factors.

At 414, the contextual request is received. For example, the content platform 240a can receive the contextual request 274 that includes the request data generated by the client device 210a, and that does not include the sensitive user data 292 from the device 210a (e.g., the user data that is being cached by the multi-platform server 220). In stage E, after receiving the contextual request 274, a contextual response 276 is generated by the content platform 240a. The context response 276, for example, can include a selection data unit for the repository 230a of digital components that corresponds to the content platform 240a. In general, a selection data unit can include data structures and/or logic used by the multi-platform server 220 and/or a corresponding repository of digital components, for selecting one or more candidate digital components for possible presentation by a client device that requested a digital component. For example, the selection data unit included in the contextual response 276 can include a repository query, a contextual selection factor (e.g., a query embedding vector used to perform factorized retrieval), an optional filter (e.g., including identifiers of candidate digital components to be filtered out at the discretion of the content platform 240a), optional configuration parameters (e.g., parameters to be used when invoking a configuration lambda function that has been previously provided by the content platform), and an optional version number of a factorized machine learning model being used to generate selection factors. Since proprietary algorithms of the content platform 240a are being used to generate the contextual response 276, for example, a layer of obfuscation (e.g., including coded values that can be interpreted by the platform's selection logic, but not by the multi-platform server 220) can be provided to protect the confidentiality of the platform 240a with respect to the multi-platform server 220.

In some implementations, a contextual response can specify, for a selection data unit, a corresponding contextual selection factor that has been determined based on request data from a client device. For example, the content platform 240a can parse the request data in the contextual request 274, and can identify various input signals (e.g., a resource being presented by the client device 210a, a digital component slot of the presented resource, etc.), and the input signals can be provided to a machine learning model that generates the contextual selection factor for the digital component request. For example, the contextual selection factor can be a query embedding vector of multiple dimensions (e.g., 32, 64, 128, etc.), or another suitable data structure. In the present example, the contextual selection factor can be an embedding vector that has a same number of dimensions as the embedding vector of the previously determined digital component selection factor, which has been determined for each digital component of the content platform 240a. The machine learning model used to generate the contextual selection factor, for example, can be the same version of the model that had previously been used to generate the digital component selection factors. Since the determination of the contextual selection factor is performed on the servers of the various content platforms 240a-n (and/or on demand side platforms included in the platforms 240a-n), for example, the machine learning technology and techniques employed by such platforms can remain private. Also, since the digital component selection factor has already been determined by the content platform 240a and only the contextual selection factor is to be determined in stage E, for example, computing resources and processing times of the content platform 240a can be reduced when serving content.

In some implementations, a contextual response can include a query header that references a repository of digital components, and a query body that is opaque to the multi-platform server. For example, the contextual response 276 can include a query header that identifies the repository 230a (e.g., a uniform resource identifier, or another suitable type of identifier), and optionally includes other information for connecting to the repository 230a. The query body, for example, can be a data structure (e.g., a byte array) that is opaque to the multi-platform server 220 (e.g., the data structure includes a layer of obfuscation, encryption, or is otherwise unreadable), but is formatted for use by the corresponding repository 230a. For example, the query body can be passed directly to an identified digital component repository as a selection query, and the repository can be configured to execute the query—as a result of the structure of the repository (e.g., table and field identifiers, data values, indexes, selection algorithms) having been previously defined through data updates provided by a content platform that also generated the contextual response with the query header/body.

In some implementations, a space-efficient data structure (e.g., a cuckoo filter, a bloom filter, etc.) can be specified in a contextual response, for later use as a filter for candidate digital components. For example, the contextual response 276 can include identifiers of candidate digital components that have been specified by the content platform 240a (and/or a demand side platform (DSP) included in and/or in communication with the content platform 240a), which are to be filtered out if they happen to result from a retrieval query specified in the contextual response 276. For example, due to a refresh frequency of data updates being provided by the content platform 240a, the platform may have more up-to-date information for candidate digital components that are to be eligible for satisfying a digital component request. Also, some types of digital component repositories may not natively support efficient filtering. By using the space-efficient data structure, for example, network bandwidth can be conserved when transmitting data between system components, and filtering can be efficiently performed in view of up-to-date information. In addition, some types of filters may not expose identifiers included in the filter, thus protecting the confidentiality of content platforms and/or DSPs.

In some implementations, a contextual response includes multiple selection data units, and specifies, for each of the selection data units, a respective contextual selection factor that has been determined by a respective server that generated the selection data unit. In general, a selection data unit can be determined by a content platform, or a component of the content platform. In implementations in which a content platform includes a supply side platform (SSP) (e.g., SSP 140, shown in FIG. 1) and one or more demand side platforms (DSPs) (e.g., DSP 150, also shown in FIG. 1), the SSP can receive the contextual request, forward the contextual request 274 to each of the DSPs with which it communicates, and receive in response to the request (from each of the DSPs) a selection data unit that has been generated by the DSP and that pertains to digital components of the DSP.

At 416, the contextual response 276, including the selection data unit(s), is transmitted. In stage F, for example, the content platform 240a can transmit the contextual response 276 for receipt by the multi-platform server 220. The contextual response 276, for example, can include one or more selection data units that have been formatted by the content platform 240a for retrieving digital components from the corresponding repository 230a. Each selection data unit, for example, can be used to retrieve digital components that are stored in the repository 230a for a corresponding content source (e.g., various DSPs that are included in and/or in communication with the content platform 240a).

At 418, the contextual response (including one or more selection data units), is received, and the selection data unit is transmitted to an appropriate digital component repository. For example, the multi-platform server 220 can receive the contextual response 276, and in stage G, can transmit a selection data unit 278 included in the contextual response 276 to the repository 230a. In some implementations, transmitting a selection data unit to a repository of digital components includes using a query header of the selection data unit to identify a repository of data units, and sending a query body of the selection data unit to an adaptor that provides a common interface to the repository of digital components. For example, the multi-platform server 270 can transmit the query body of the selection data unit 278 to adaptor 232a of the repository 230a, based on the query header of the selection data unit 278.

In general, each of the adaptors 232a-n can be designed to connect to a specific type of repository (e.g., a type of data repository technology, such as a type of database server, file-based server, in-memory repository, etc.), and can expose the same set of standardized functionalities to the multi-platform server 220 through an abstract interface. For example, each of the adaptors 232a-n can be part of a code base of the multi-platform server 220 and can be subject to the same software development/audit process and release schedule. Each of the adaptors 232a-n, for example, can augment queries of a selection data unit with user signals, can send the queries to an appropriate digital component repository, and can reformat a retrieval result so that the code base of the multi-platform server 220 can interact with the retrieval result through a standard interface. To support new types of repositories, for example, developers of such technologies can implement a new adaptor in the code base of the multi-platform server 220. Since the specific implementations of the adaptors 232a-n are decoupled from the rest of the code base of the multi-platform server 220, for example, changes within the adaptors and the addition of new adaptors can be accomplished with minimal impact on the multi-platform server 220. Further, the functionality of the adaptors 232a-n and the code used to implement the adaptors can be transparent to the various parties that operate within the environment 200, such that fairness and trust is maintained between the parties.

At 420, the selection data is received, and digital components are retrieved. In stage H, for example, the repository 230a can receive the selection data unit(s) 278, and can retrieve digital components (or references to the digital components) that satisfy the selection data unit(s) 278. For example, the repository 230a can execute one or more queries included in the selection data unit 278, according to a functionality of the repository. If the repository 230a is a sharded database server, for example, the repository 230a can submit the query to multiple different database shards in parallel, and can aggregate the query results. If the repository 230a is a file-based server, for example, the repository 230a can retrieve data from a file location. If the repository 230a uses an in-memory technology, for example, the repository 230a can retrieve data from memory of the multi-platform server 220 or another server. Since the repository 230a has been structured according to updates (e.g., data update 270)) previously received from the content platform 240a, for example, the proprietary retrieval techniques (e.g., indexing, selection algorithms) can be used to retrieve digital components, thus ensuring optimized serving performance of the repository 230a. In instances in which configuration parameters are received in the selection data unit 278, for example, the repository 230a can invoke a configuration lambda function that has previously been provided by the content platform 240a, by passing the configuration parameters to the lambda function. The configuration lambda function(s), for example, can be used to support experiments whose diversion decisions are made by the content platform 240a, as well as customized scoring of digital components.

In some implementations, a factorized retrieval process can be performed when retrieving digital components, based on a digital component selection factor and a contextual selection factor. For example, the repository 230a can receive a respective contextual selection factor (e.g., a query embedding vector) in each selection data unit 278 received from the multi-platform server 220, and can identify a digital component selection factor (e.g., another embedding vector, of equal dimension) for each digital component that results from the query/queries included in the selection data unit 278. In the present example, the repository 230a can determine, for each digital component, a corresponding dot product of the embedding vectors. As another example, the dot products can be determined by the multi-platform server 220. Each of the dot products, for example, can be associated with the corresponding digital component (e.g., as metadata), for use in downstream filtering and selection processes. In general, computing the dot product can be fast computation, and can be performed with fewer computing resources than would be used if directly employing a machine learning model.

At 422, the digital components are transmitted. In stage I, for example, the repository 230a can transmit digital components 280 that satisfy the selection data unit 278 (and/or data that identifies the digital components), to the multi-platform server 220. In scenarios in which multiple different demand side providers (DSPs) have provided selection data units, for example, the repository 230a can provide a consolidated contextual response to the multi-platform server 220 that includes digital components for each of the DSPs. In the present example, the digital components 280 can be provided through adaptor 232a in a common format, such that the multi-platform server 220 can interact with digital components from any of the repositories 230a-n in a standard manner, using the same code base.

At 424, the digital components that satisfy the selection data unit 278 are received by the multi-platform server 220, and at 426, the digital components are filtered (and/or have already been filtered), based on the user data. In stage J, for example, the digital component repository 230a and/or the multi-platform server 220 can perform a digital component filtering/selection process 282. For example, the digital component repository 230a and/or the multi-platform server 220 can filter the digital components 280 that satisfy the selection data unit 278, to exclude digital components that do not conform to the sensitive user data 292 previously received by the multi-platform server 220 in the digital component request 272.

In some implementations, at least a portion of the filtering based on the user data can be performed by a digital component repository when retrieving digital components, before the digital components are provided to a multi-platform server. During stage G, for example, the multi-platform server 220 can modify one or more queries included in the selection data unit(s) 278 to include set membership data (e.g., a user's membership in various interest groups, the user's preferences to block particular types of content, etc.), based on the cached user data 292. The digital components 280 returned by the repository 230a during stage I, for example, are thus filtered according to the user data, through the retrieval process conducted by the repository 230a.

In some implementations, at least a portion of the filtering based on the user data can be performed by a multi-platform server, after the digital components are received by the multi-platform server. During stage G, for example, the multi-platform server 220 can forward the one or more queries included in the selection data unit(s) 278 without modification. In the present example, the digital components 280 received from the repository 230a during stage I may not be filtered according to the cached user data 292, and during stage J, the multi-platform server 220 can then use the user data 292 to filter the digital components 280. For example, each of the digital components 280 received from the repository 230a can be eligible for presentation to particular user groups (e.g., according to metadata associated with the digital components). In the present example, the multi-platform server 220 can compare user group memberships specified in the cached user data 292, and the eligible user groups specified for each of the digital components 280. If a given digital component is not associated with a user group that exists in the specified user group memberships, for example, the given digital component can be filtered from the digital components 280. As another example, the user data 292 can include blocking preference data that specifies particular digital content items (or types of content items) that the user prefers to be blocked. The multi-platform server 220, for example, can filter out any digital components 280 that correspond to the blocking preference data.

In some implementations, after retrieving, filtering, and/or selecting the digital components that satisfy the selection data unit, the sensitive user data can be purged from the multi-platform server. For example, the multi-platform server 220 can purge the cached user data 292 after using the data to filter the digital components 280 (e.g., during the digital component filtering/selection process 282). In the present example, as the user data 292 is being used by the multi-platform server 220 to retrieve/filter digital components for a particular digital component request 272, the data is not to be maintained by the server after the request is serviced. If updates are to be made to the user data 292, for example, the updates (e.g., user group membership changes, content blocking preferences, etc.) can be made at the client device 210a and can be provided to the multi-platform server 220 for a subsequent digital component request. Thus, user privacy can be controlled and preserved at the user's client device.

At 428, a digital component is selected, based at least in part on a digital component selection factor and a contextual selection factor. For example, the digital component repository 230a and/or the multi-platform server 220 can select one of the digital components 280 that remain after filtering the digital components that satisfy the selection data unit 278. In some implementations, selecting one of the digital components can include, for each of the digital components that remain after filtering the digital components that satisfy the selection data unit, generating a score, based on the digital component selection factor and the contextual selection factor, and selecting a digital component with the greatest score. For digital component repositories that include multiple shards, for example, the repository can receive a configurable parameter that indicates a number of candidate digital components to retrieve from each shard (e.g., a number of candidate digital components having a greatest score), and the repository can select from all of the candidate digital components retrieved across the shards.

In some implementations, a generated score can be derived from a dot product of multiple embedding vectors. The digital component selection factor and the contextual selection factor, for example, can each be embedding vectors of equal dimension, and the generated score can be derived from a dot product that has been calculated from the two vectors. As another example, a linear transformation can be applied to the dot product (e.g., by multiplying the dot product by a scaling factor, adding an offset, or applying another sort of linear transformation. As another example, a configurable lambda function can be used to transform dot product results (e.g., when a desired transformation is non-linear). For example, a provider of digital components (e.g., one of the providers 260a-n and/or one of the content platforms 240a-n) can define a lambda function in a high-level programming language, which is compiled into byte code to speed up execution and to provide a layer of obfuscation for confidentiality purposes. The byte code, for example, can be executed in a sandboxed virtual machine by the multi-platform server 220 and/or a corresponding repository 230a-n. The lambda function, for example, can be used to transform dot products for all candidate digital components for a content provider, or a subset of the candidate digital components (e.g., components in a defined group). Lambda functions that operate within the trust boundary 290, for example, may accept as input the user data 292, in addition to the dot product results.

At 430, the selected digital component is provided, and at 432, the selected digital component is presented. In stage K, for example, the multi-platform server 220 can provide the selected digital component 284 for presentation by the client device 210a. After receiving the selected digital component 284, for example, the client device 210a can present the component along with a resource being presented by the device (e.g., by inserting the component in a digital component slot of the resource).

Although the illustrated flow of data shows a trusted server as being an intermediary for fulfilling digital component requests, in some implementations, a digital component request can be served directly by a content platform, in the event of a production outage of the trusted server. In stage C, for example, the client device 210a can determine that the multi-platform server 220 is experiencing a production outage, and can provide a digital component request 272 that includes contextual data and that does not include user data, directly to content platform 240a. In response to directly receiving the digital component request 272, for example, the content platform 240a can serve one or more digital components that satisfy the contextual data, directly to the client device 210a.

Figure 5:
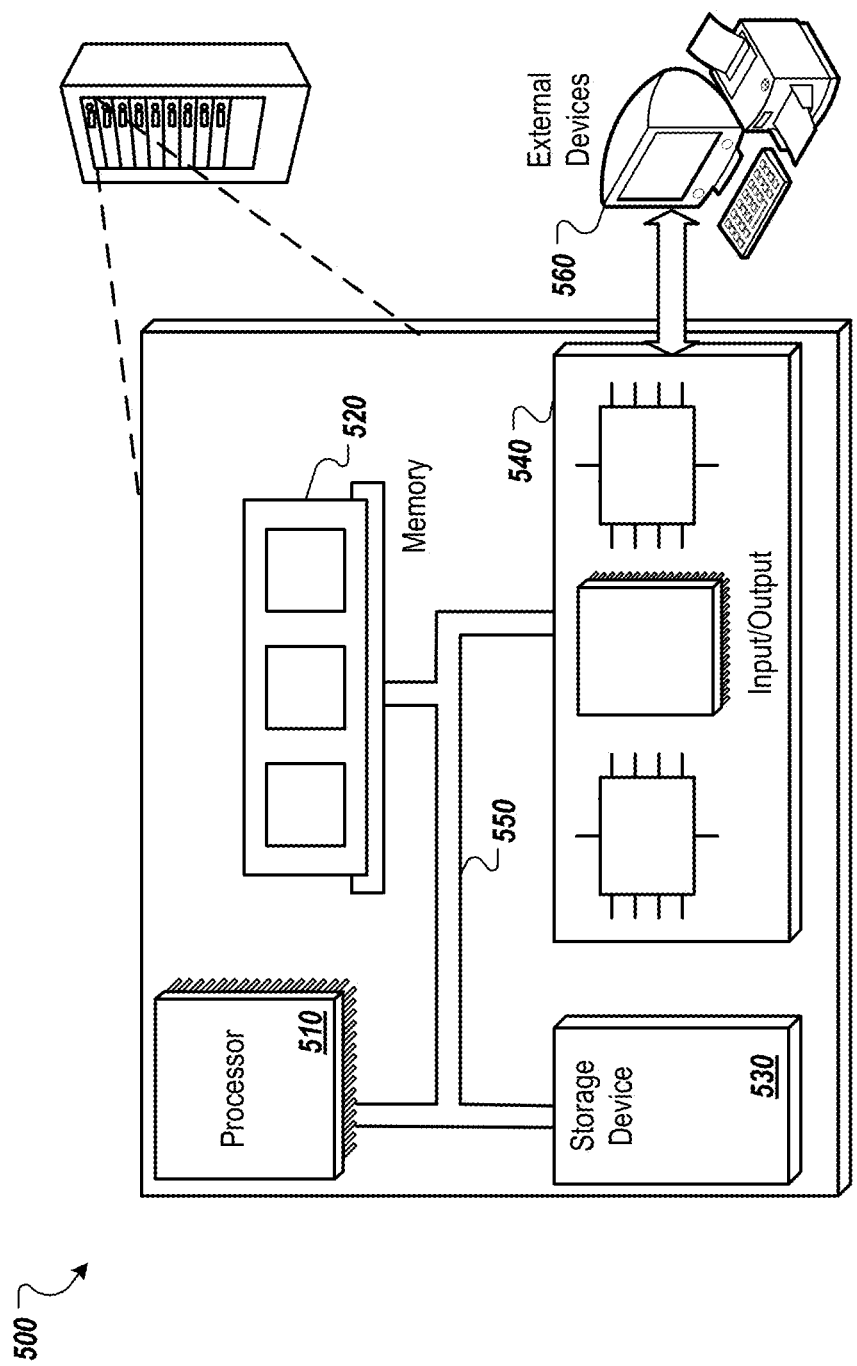
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for selecting digital components from a repository of digital components while securing user data, the method comprising:
   receiving, by a multi-platform server and from a client device, a request for a digital component for presentation by the client device, wherein the request for the digital component includes (i) request data that is opaque to the multi-platform server, and (ii) sensitive user data that is managed by the client device;
   in response to receiving the request for the digital component, transmitting, by the multi-platform server and to a first content platform, a contextual request that includes the request data from the client device and that does not include the sensitive user data;
   after transmitting the contextual request, receiving, by the multi-platform server and from the first content platform, a contextual response that includes a selection data unit for a first repository of digital components, wherein the first repository of digital components is within a trust boundary of the multi-platform server and stores digital components of the first content platform;
   in response to receiving the contextual response, transmitting, by the multi-platform server, the selection data unit to the first repository of digital components;
   after transmitting the selection data unit to the first repository of digital components, receiving, by the multi-platform server from the first repository of digital components, a plurality of digital components that satisfy the selection data unit;
   filtering the plurality of digital components that satisfy the selection data unit to exclude one or more digital components that do not conform to the sensitive user data received by the multi-platform server in the request for the digital component;
   selecting one of the digital components that remain after filtering the plurality of digital components that satisfy the selection data unit; and
   providing, by the multi-platform server, the selected one of the digital components for presentation by the client device.

2. The computer-implemented method of claim 1, further comprising:
   prior to receiving the contextual request from the client device, receiving, by the multi-platform server and from the first content platform, a first data update that specifies digital components of the first content platform; and
   modifying, by the multi-platform server, the first repository of digital components according to the first data update.

3. The computer-implemented method of claim 2, wherein the first data update specifies, for each digital component of the first content platform referenced in the first data update, a respective digital component selection factor that has been determined for the digital component.

4. The computer-implemented method of claim 3, wherein the contextual response specifies, for the selection data unit, a corresponding contextual selection factor that has been determined based on the request data from the client device.

5. The computer-implemented method of claim 4, wherein selecting one of the digital components comprises:
   for each of the digital components that remain after filtering the plurality of digital components that satisfy the selection data unit, generating a score, based on the digital component selection factor and the contextual selection factor; and
   selecting the digital component with the greatest score.

6. The computer-implemented method of claim 2, further comprising:
   receiving, by the multi-platform server and from a second content platform, a second data update that specifies digital components of the second content platform; and
   modifying, by the multi-platform server, a second repository of digital components according to the second data update, wherein the second repository of digital components is within the trust boundary of the multi-platform server and is a different repository platform than that of the first repository of digital components, and wherein the multi-platform server uses a first adaptor to interface with the first repository of digital components and a second, different, adaptor to interface with the second repository of digital components.

7. The computer-implemented method of claim 1, wherein the request for the digital component is generated by code of the first content platform that is executed by the client device.

8. The computer-implemented method of claim 1, wherein the selection data unit includes (i) a query header that references the first repository of digital components and (ii) a query body that is opaque to the multi-platform server, wherein transmitting the selection data unit to the first repository of digital components comprises (i) using the query header of the selection data unit to identify the first repository of digital components, and (ii) sending the query body of the selection data unit to an adaptor that provides a common interface to the first repository of digital components.

9. The computer-implemented method of claim 8, wherein the contextual response includes multiple selection data units for the first repository of digital components, and specifies, for each selection data unit of the multiple selection data units, a respective contextual selection factor that has been determined by a respective digital content server that generated the selection data unit.

10. The computer-implemented method of claim 1, further comprising:
    after filtering the plurality of digital components that satisfy the selection data unit, purging the sensitive user data from the multi-platform server.

11. A system for selecting digital components from a repository of digital components while securing user data, the system comprising:
    one or more processors; and
    one or more storage devices storing instructions that, when executed by the one or more processors, cause the one or more processors perform operations comprising:
        receiving, by a multi-platform server and from a client device, a request for a digital component for presentation by the client device, wherein the request for the digital component includes (i) request data that is opaque to the multi-platform server, and (ii) sensitive user data that is managed by the client device;
        in response to receiving the request for the digital component, transmitting, by the multi-platform server and to a first content platform, a contextual request that includes the request data from the client device and that does not include the sensitive user data;
        after transmitting the contextual request, receiving, by the multi-platform server and from the first content platform, a contextual response that includes a selection data unit for a first repository of digital components, wherein the first repository of digital components is within a trust boundary of the multi-platform server and stores digital components of the first content platform;
        in response to receiving the contextual response, transmitting, by the multi-platform server, the selection data unit to the first repository of digital components;
        after transmitting the selection data unit to the first repository of digital components, receiving, by the multi-platform server from the first repository of digital components, a plurality of digital components that satisfy the selection data unit;
        filtering the plurality of digital components that satisfy the selection data unit to exclude one or more digital components that do not conform to the sensitive user data received by the multi-platform server in the request for the digital component;
        selecting one of the digital components that remain after filtering the plurality of digital components that satisfy the selection data unit; and
        providing, by the multi-platform server, the selected one of the digital components for presentation by the client device.

12. The system of claim 11, wherein the operations comprise:
    prior to receiving the contextual request from the client device, receiving, by the multi-platform server and from the first content platform, a first data update that specifies digital components of the first content platform; and
    modifying, by the multi-platform server, the first repository of digital components according to the first data update.

13. The system of claim 12, wherein the first data update specifies, for each digital component of the first content platform referenced in the first data update, a respective digital component selection factor that has been determined for the digital component.

14. The system of claim 13, wherein the contextual response specifies, for the selection data unit, a corresponding contextual selection factor that has been determined based on the request data from the client device.

15. The system of claim 14, wherein selecting one of the digital components comprises:
    for each of the digital components that remain after filtering the plurality of digital components that satisfy the selection data unit, generating a score, based on the digital component selection factor and the contextual selection factor; and
    selecting the digital component with the greatest score.

16. The system of claim 12, wherein the operations comprise:
    receiving, by the multi-platform server and from a second content platform, a second data update that specifies digital components of the second content platform; and
    modifying, by the multi-platform server, a second repository of digital components according to the second data update, wherein the second repository of digital components is within the trust boundary of the multi-platform server and is a different repository platform than that of the first repository of digital components, and wherein the multi-platform server uses a first adaptor to interface with the first repository of digital components and a second, different, adaptor to interface with the second repository of digital components.

17. The system of claim 11, wherein the request for the digital component is generated by code of the first content platform that is executed by the client device.

18. The system of claim 11, wherein the selection data unit includes (i) a query header that references the first repository of digital components and (ii) a query body that is opaque to the multi-platform server, wherein transmitting the selection data unit to the first repository of digital components comprises (i) using the query header of the selection data unit to identify the first repository of digital components, and (ii) sending the query body of the selection data unit to an adaptor that provides a common interface to the first repository of digital components.

19. The system of claim 18, wherein the contextual response includes multiple selection data units for the first repository of digital components, and specifies, for each selection data unit of the multiple selection data units, a respective contextual selection factor that has been determined by a respective digital content server that generated the selection data unit.

20. A non-transitory computer readable medium carrying instructions that, when executed by one or more processors, cause the one or more processors to perform operations comprising:

receiving, by a multi-platform server and from a client device, a request for a digital component for presentation by the client device, wherein the request for the digital component includes (i) request data that is opaque to the multi-platform server, and (ii) sensitive user data that is managed by the client device;

in response to receiving the request for the digital component, transmitting, by the multi-platform server and to a first content platform, a contextual request that includes the request data from the client device and that does not include the sensitive user data;

after transmitting the contextual request, receiving, by the multi-platform server and from the first content platform, a contextual response that includes a selection data unit for a first repository of digital components, wherein the first repository of digital components is within a trust boundary of the multi-platform server and stores digital components of the first content platform;

in response to receiving the contextual response, transmitting, by the multi-platform server, the selection data unit to the first repository of digital components;

after transmitting the selection data unit to the first repository of digital components, receiving, by the multi-platform server from the first repository of digital components, a plurality of digital components that satisfy the selection data unit;

filtering the plurality of digital components that satisfy the selection data unit to exclude one or more digital components that do not conform to the sensitive user data received by the multi-platform server in the request for the digital component;

selecting one of the digital components that remain after filtering the plurality of digital components that satisfy the selection data unit; and providing, by the multi-platform server, the selected one of the digital components for presentation by the client device.

\* \* \* \* \*

UNITED STATES PATENT AND TRADEMARK OFFICE
CERTIFICATE OF CORRECTION

| | | |
|---|---|---|
| PATENT NO. | : 12,367,312 B2 | Page 1 of 1 |
| APPLICATION NO. | : 18/284755 | |
| DATED | : July 22, 2025 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 152 days.

Signed and Sealed this
Sixteenth Day of December, 2025

John A. Squires
*Director of the United States Patent and Trademark Office*